United States Patent
Kim et al.

(10) Patent No.: US 12,074,360 B2
(45) Date of Patent: Aug. 27, 2024

(54) RFIC ASSEMBLED ANTENNA

(71) Applicant: SENSORVIEW CO., LTD., Seongnam-si (KR)

(72) Inventors: Byoung Nam Kim, Suwon-si (KR); Hong Il Yoo, Gwangmyeong-si (KR); Chul-Keun Park, Seongnam-si (KR); Chan-Woo Park, Seoul (KR)

(73) Assignee: SENSORVIEW CO., LTD., Seongnam-si (KR)

( * ) Notice: Subject to any disclaimer, the term of this patent is extended or adjusted under 35 U.S.C. 154(b) by 136 days.

(21) Appl. No.: 18/047,089

(22) Filed: Oct. 17, 2022

(65) Prior Publication Data

US 2023/0129616 A1 Apr. 27, 2023

(30) Foreign Application Priority Data

Oct. 22, 2021 (KR) .................. 10-2021-0141695
Jan. 27, 2022 (KR) .................. 10-2022-0012395

(51) Int. Cl.
*H01Q 1/22* (2006.01)
*G06K 19/077* (2006.01)
*H01Q 1/38* (2006.01)

(52) U.S. Cl.
CPC ....... *H01Q 1/2283* (2013.01); *G06K 19/0775* (2013.01); *H01Q 1/38* (2013.01)

(58) Field of Classification Search
CPC ........ H01Q 1/2283; H01Q 1/38; H01Q 1/526; H01Q 3/267; H01Q 9/285; H01Q 23/00; H01Q 19/30; G06K 19/0775
See application file for complete search history.

(56) References Cited

U.S. PATENT DOCUMENTS

| | | | |
|---|---|---|---|
| 6,008,773 A | 12/1999 | Matsuoka et al. | |
| 9,806,422 B2 | 10/2017 | Garcia et al. | |
| 11,296,421 B2* | 4/2022 | Han | H01Q 21/0025 |
| 11,929,564 B2* | 3/2024 | Woo | H01Q 1/526 |
| 2022/0263223 A1* | 8/2022 | Öjefors | H01Q 21/26 |
| 2023/0014567 A1* | 1/2023 | Yeon | H01Q 9/0414 |

FOREIGN PATENT DOCUMENTS

| | | |
|---|---|---|
| KR | 10-2008-0051435 A | 6/2008 |
| KR | 10-2017-0016377 A | 2/2017 |
| KR | 10-2019-0062064 A | 6/2019 |
| KR | 10-2020-0112581 A | 10/2020 |
| KR | 10-2021-0009531 A | 1/2021 |

* cited by examiner

*Primary Examiner* — Seung H Lee

(57) ABSTRACT

An RFIC assembled antenna comprises: a first layer substrate including a first metal pattern, a first slot formed in the first metal pattern, and a second slot formed to be connected to the first slot, and in which an RFIC chip is coupled to a region of the second slot; and a second layer substrate coupled to a lower portion of the first layer substrate and including a second metal pattern, a third slot formed in the second metal pattern, and a dipole radiator formed inside the third slot, wherein a feeding pattern connected to the RFIC chip to provide a feed signal to the dipole radiator is formed inside the first slot.

14 Claims, 9 Drawing Sheets

RFIC ASSEMBLED ANTENNA

CROSS-REFERENCE TO RELATED APPLICATIONS

This application claims priority under 35 U.S.C. § 119(a) to Korean Patent Application No. 10-2021-0141695, filed on Oct. 22, 2021, and Korean Patent Application No. 10-2022-0012395, filed on Jan. 27, 2022, in the Korean Intellectual Property Office, the disclosures of which are incorporated herein in their entireties by reference.

BACKGROUND

1. Technical Field

The present disclosure relates to an antenna, and more particularly to an RFIC(Radio-Frequency Integrated Circuit) assembled antenna.

2. Description of the Related Art

In recent years, 5G communication has been started, in which 5G performs communication using a millimeter wave band of 20 GHz or more compared to the existing 4G communication. The millimeter wave band has a very large attenuation characteristic compared to the low frequency band, and the signal loss due to an obstacle is very large.

In the 5G band, very large-capacity IoT data, 360-degree video data, VR data, and various types of big data are supported through mobile communication networks, and for this reason, communication using the millimeter wave band is essential.

In the millimeter wave band, it has a very large attenuation characteristic, and for this reason, an antenna for millimeter wave requires high directivity.

Meanwhile, since the millimeter wave band is a very high frequency band, the size of the antenna is also reduced. A conventional millimeter wave band antenna for a terminal was connected to a board of the terminal through a connector, and received a feed signal from an RFIC chip mounted on the board of the terminal.

Since the millimeter wave band antenna has a small size, a connector with fine precision was also required for the connector, and sophisticated work was also required to combine the millimeter wave band antenna with the connector. Furthermore, due to the use of the connector, there was a problem that not only the size of the entire terminal increases, but also the manufacturing cost increases.

SUMMARY

An object of the present disclosure is to propose a millimeter wave band antenna having a structure in which an RFIC chip is assembled without being connected to an RFIC chip through a connector.

Another object of the present disclosure is to propose a millimeter wave band antenna capable of reducing the size of a terminal and reducing manufacturing cost.

Yet another object of the present disclosure is to propose a millimeter wave band antenna capable of forming a required radiation pattern while effectively blocking harmful electromagnetic waves.

According to one aspect of the present disclosure, conceived to achieve the objectives above, an RFIC assembled antenna is provided, the antenna comprising: a first layer substrate including a first metal pattern, a first slot formed in the first metal pattern, and a second slot formed to be connected to the first slot, and in which an RFIC chip is coupled to a region of the second slot; and a second layer substrate coupled to a lower portion of the first layer substrate and including a second metal pattern, a third slot formed in the second metal pattern, and a dipole radiator formed inside the third slot, wherein a feeding pattern connected to the RFIC chip to provide a feed signal to the dipole radiator is formed inside the first slot.

At least one parasitic pattern spaced apart from the feeding pattern by a predetermined distance and extending in a direction perpendicular to the longitudinal direction of the feeding pattern is formed inside the first slot.

An auxiliary radiator spaced apart from the feeding pattern by a predetermined distance and extending in a direction parallel to the longitudinal direction of the feeding pattern is further formed inside the first slot, and the auxiliary radiator is connected to the RFIC chip.

The auxiliary radiator receives a portion of the signal radiated from the dipole radiator and provides it to the RFIC chip.

The antenna further includes a third layer substrate positioned below the second layer substrate, and at least one reflector is formed on the third layer substrate in a region that vertically overlaps with the first slot and the second slot.

The antenna is coupled to an SMT region of a terminal board, and at least one via hole for providing a feed signal from the terminal board to the RFIC chip is formed in the first to third layer substrates.

According to another aspect of the present disclosure, an RFIC assembled antenna is provided, the antenna comprising: a first layer substrate including a first metal pattern, a first slot formed in the first metal pattern, and a second slot formed to be connected to the first slot, and in which an RFIC chip is coupled to a region of the second slot; and a second layer substrate coupled to a lower portion of the first layer substrate and including a second metal pattern and a dipole radiator coupled to the second metal pattern, wherein a feeding pattern connected to the RFIC chip to provide a feed signal to the dipole radiator is formed inside the first slot or the second slot, and wherein a shield can for shielding the RFIC chip is coupled to a region of the second slot of the first layer substrate.

According to the present disclosure, since it has a structure in which an RFIC chip is assembled with an antenna, the size of the terminal can be reduced, the manufacturing cost can be reduced, and it can effectively block electromagnetic interference caused by the integration of the RFIC chip.

DETAILED DESCRIPTION

Figure 1:
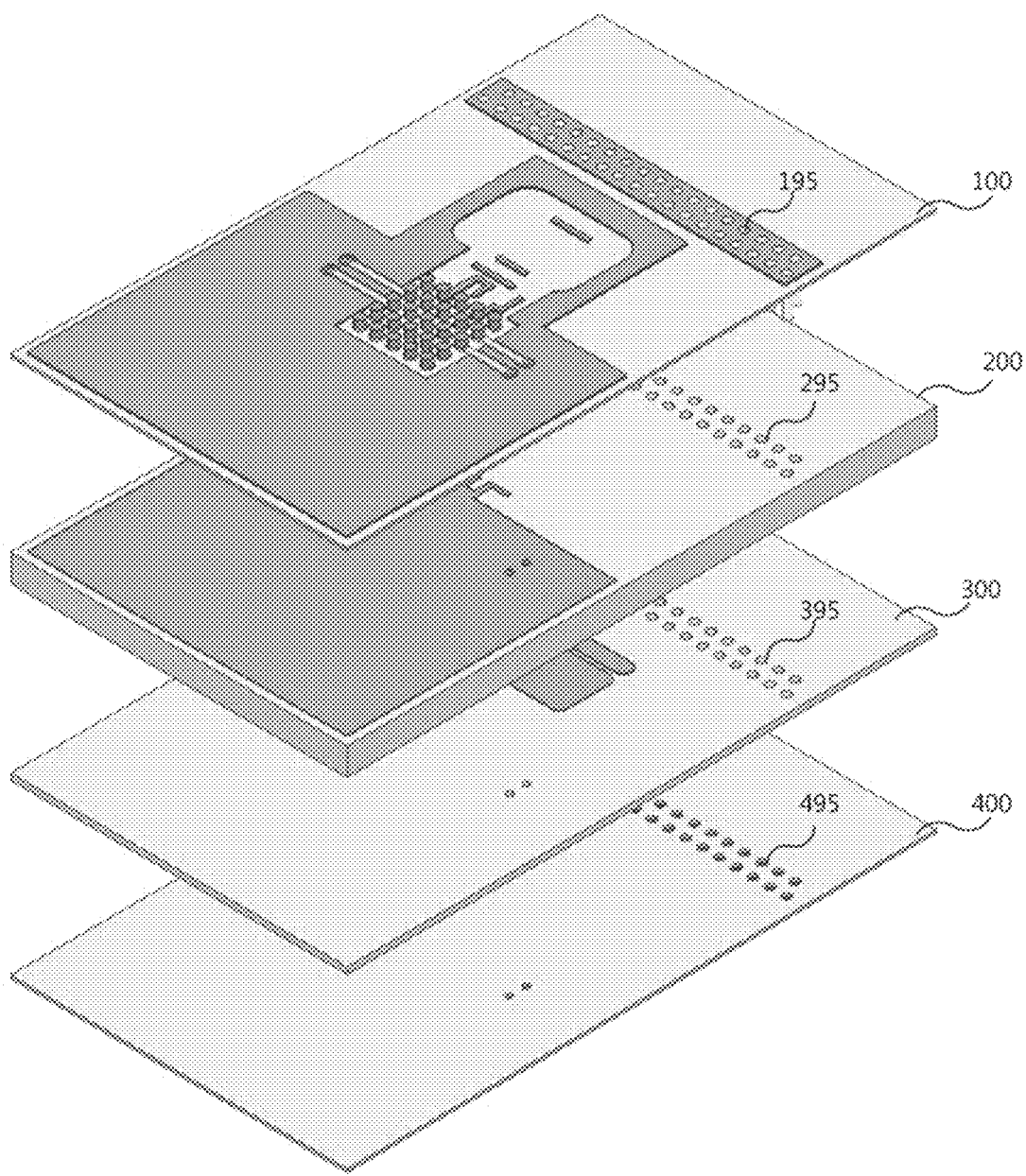
FIG. 1 is an exploded perspective view showing a structure of an RFIC assembled antenna according to an embodiment of the present disclosure.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

Figure 2:
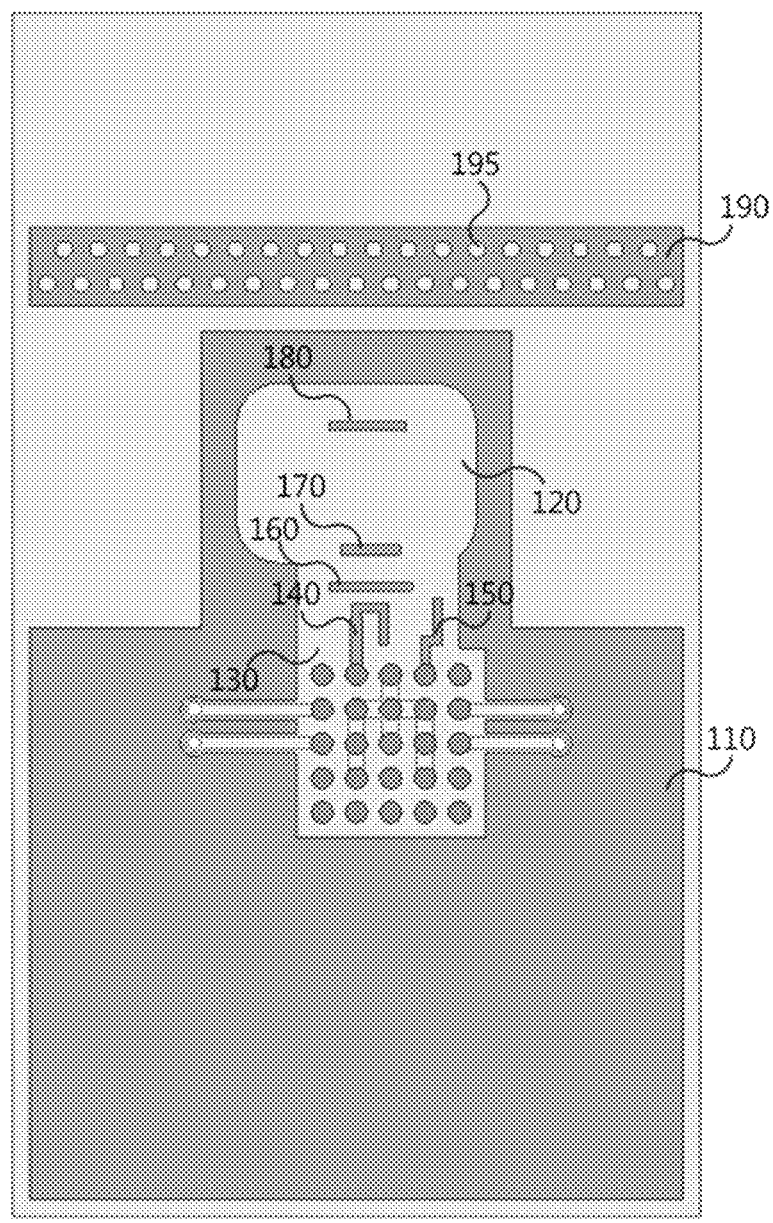
FIG. 2 is a plan view of a first layer substrate in an RFIC assembled antenna according to an embodiment of the present disclosure.
Figure 3:
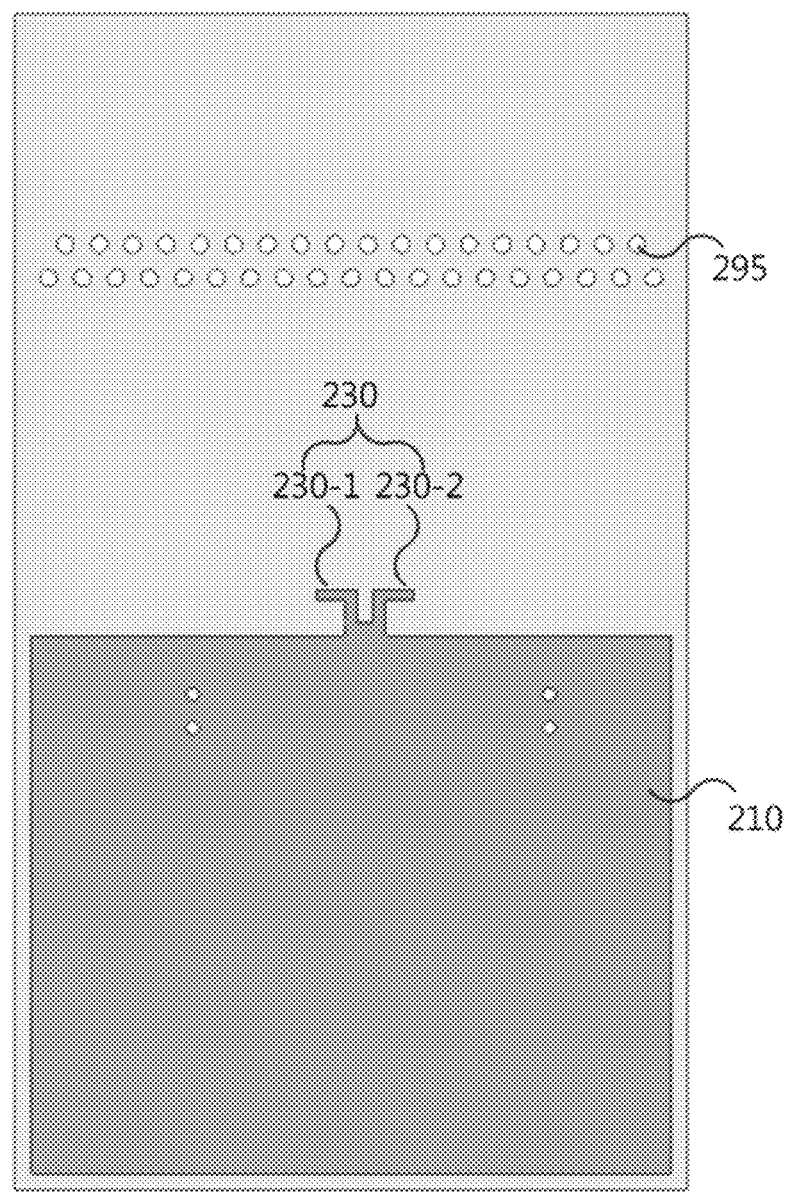
FIG. 3 is a plan view of a second layer substrate in an RFIC assembled antenna according to an embodiment of the present disclosure.
Figure 4:
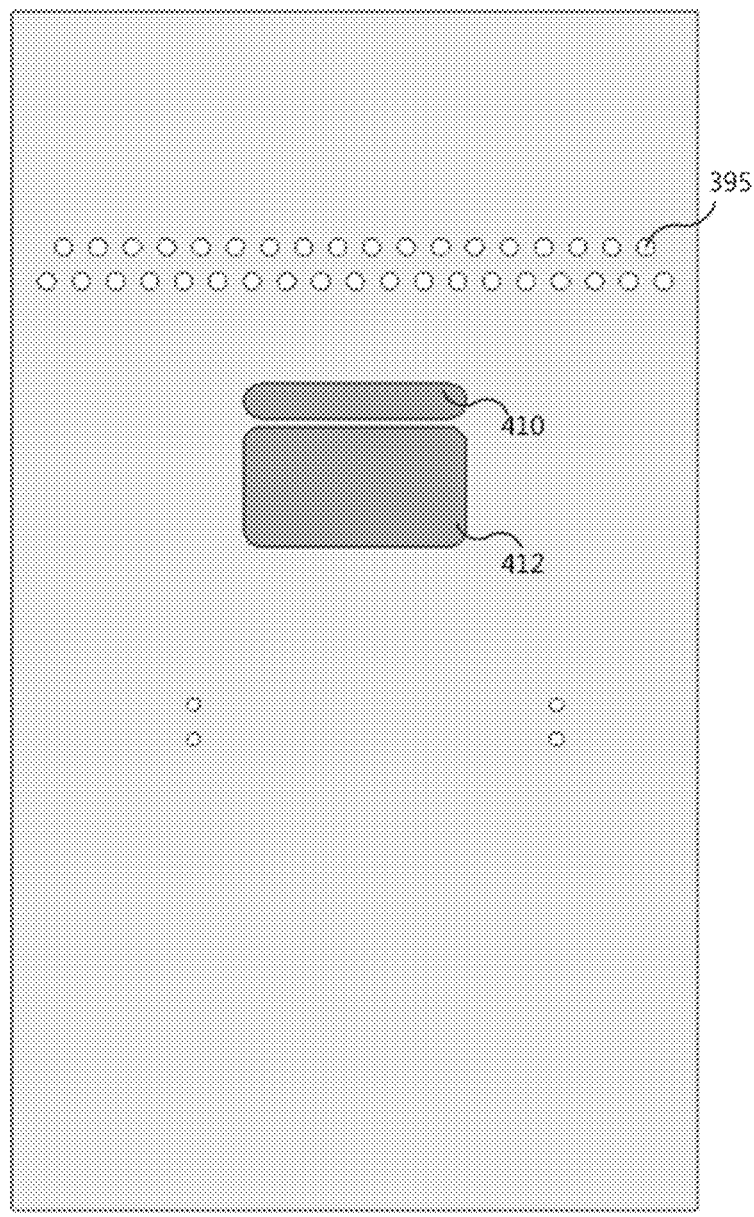
FIG. 4 is a plan view of a third layer substrate in an RFIC assembled antenna according to an embodiment of the present disclosure.
Figure 5:
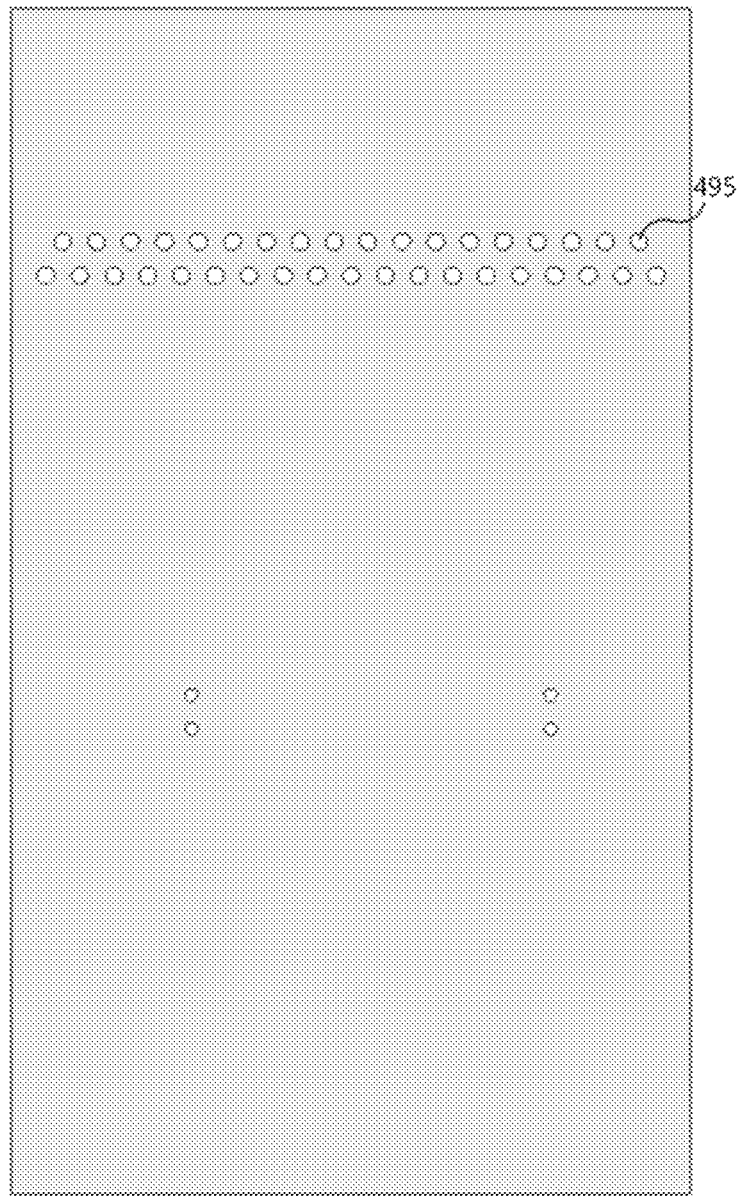
FIG. 5 is a plan view of a fourth layer substrate in an RFIC assembled antenna according to an embodiment of the present disclosure.

FIG. 1 is an exploded perspective view showing a structure of an RFIC assembled antenna according to an embodiment of the present disclosure, FIG. 2 is a plan view of a first layer substrate in an RFIC assembled antenna according to an embodiment of the present disclosure, and FIG. 3 is a plan view of a second layer substrate in an RFIC assembled antenna according to an embodiment of the present disclosure. FIG. 4 is a plan view of a third layer substrate, and FIG. 5 is a plan view of a fourth layer substrate according to an embodiment of the present disclosure.

Referring to FIG. 1, the RFIC assembled antenna according to an embodiment of the present disclosure may include first to fourth layer substrates 100, 200, 300 and 400. The multi-layer structure for the RFIC assembled antenna of the present disclosure may be implemented using a multi-layer PCB. Meanwhile, although FIG. 1 illustrates a case composed of four layer substrates, it will be apparent to those skilled in the art that additional substrates may be provided to control the separation distance between respective substrates and to control the characteristics. In addition, it will also be apparent to those skilled in the art that certain layer substrates may be omitted.

Referring to FIGS. 1 and 2, a first metal pattern 110 is formed on the first layer substrate 100. The first metal pattern 110 may have a ground potential.

A first slot 120 and a second slot 130 are formed in the first metal pattern 110. The first slot 120 and the second slot 130 are formed by removing a portion of the metal region of the first metal pattern 110.

Inside the first slot 120 and the second slot 130, a feeding pattern 140, an auxiliary radiator 150, a first parasitic pattern 160, a second parasitic pattern 170 and a third parasitic pattern 180 are formed. The first slot 120 is formed so that the dipole radiator 230 formed in the second layer substrate 200 can radiate an RF signal with high gain through a narrower beamwidth.

The feeding pattern 140 is connected to the RFIC chip in the region of the second slot 130, and receives a feed signal from the RFIC chip. The feeding pattern 140 functions to provide a feed signal to the dipole radiator 230 formed on the second layer substrate 200 in a coupling manner. In FIGS. 1 and 2, a 'ㅜ'-shaped feeding pattern 140 is shown, but the shape of the feeding pattern 140 may be changed as needed.

The first parasitic pattern 160 formed in the first slot 120 or the second slot 130 may be formed in a direction perpendicular to the longitudinal direction of the feeding pattern 140. The first parasitic pattern 160 is not electrically connected to the ground or signal line, and the first parasitic pattern 160 is formed to improve the gain of the radiation pattern of the dipole radiator 230 formed on the second layer substrate 200. The length of the first parasitic pattern 160 may be determined based on a used frequency and a required radiation pattern.

Meanwhile, a second parasitic pattern 170 and a third parasitic pattern 180 may be additionally formed in the first slot 120. The second parasitic pattern 170 and the third parasitic pattern 180 may be spaced apart from the first parasitic pattern 160, and formed in a direction parallel to the first parasitic pattern 160. The second parasitic pattern 170 and the third parasitic pattern 180 are also not electrically connected to the ground or the signal line.

The second parasitic pattern 170 is spaced apart from the first parasitic pattern 160, the third parasitic pattern 180 is spaced apart from the second parasitic pattern 170, and the third parasitic pattern 180 is disposed to be spaced apart from the first parasitic pattern by a greater distance compared to the second parasitic pattern 170. According to an embodiment of the present disclosure, the third parasitic pattern 180 may be disposed adjacent to the edge region of the first slot. The second parasitic pattern 170 and the third parasitic pattern 180 also function to improve the gain of the radiation pattern.

The auxiliary radiator 150 is electrically connected to the RFIC chip, and receives a portion of a signal radiated from the dipole radiator 230. The auxiliary radiator 150 receives a portion of a signal radiated from the dipole radiator 230. The auxiliary radiator 150 is used for determining whether a signal radiated from the dipole radiator 230 is appropriate, and receives a portion of the radiation signal. The signal received from the auxiliary radiator 150 is provided to the RFIC chip, and it is possible to determine whether the antenna malfunctions by analyzing the signal provided to the RFIC chip through the auxiliary radiator 150.

The present disclosure makes it possible to easily detect an antenna malfunction without using a separate diagnostic structure, by forming the auxiliary radiator 150 in the slots 120 and 130 formed in the first layer substrate 100 that is the upper layer of the second layer substrate 200 on which the dipole radiator 230 is formed.

A second slot 130 connected to the first slot 120 is formed in the first metal pattern 110 of the first layer substrate 100.

Although not shown in FIGS. 1 and 2, the second slot 130 is a slot for placing an RFIC chip. In addition, in an embodiment to be described later, a shield can may be disposed to shield the RFIC chip, and the shield can is also disposed in the region of the second slot 130. Although the second slot 130 is connected to the first slot 120, the width and shape are different from those of the first slot 120.

Meanwhile, on the first layer substrate 100 a third metal pattern 190 is formed spaced apart from the first metal pattern 110, and a plurality of first via holes 195 are formed in the third metal pattern 190. Referring to FIG. 1, the plurality of first via holes 195 may be formed in the longitudinal direction of the third metal pattern 190, and the plurality of first via holes 195 may be arranged to form two rows. Of course, the arrangement of the plurality of first via holes 195 illustrated in FIG. 1 is exemplary, and the plurality of first via holes 195 may be arranged in various ways.

When the RFIC chip and the shield can shielding it are directly coupled to the antenna, the radiation pattern of the antenna may be affected. Although the radiation pattern should be formed in a direction passing through the first slot and the second slot, the radiation pattern may be tilted due to the influence of the RFIC chip and the shield can.

In order to prevent distortion of the radiation pattern, in the present disclosure, a third metal pattern 190 spaced apart from the first metal pattern is formed, and a plurality of first via holes 195 are formed in the third metal pattern 190.

Via holes connected to the third metal pattern 190 are also formed in the second layer substrate 200, the third layer substrate 300 and the fourth layer substrate 400. A plurality of second via holes 295 connected to the first via holes 195 are formed in the second layer substrate 200, a plurality of third via holes 395 connected to the plurality of second via holes 295 are formed in the third layer substrate 300, and a plurality of fourth via holes 495 connected to the plurality of third via holes 395 are formed in the fourth layer substrate 400.

In this way, a conductive wall may be formed by forming via holes connected to each other in the first layer substrate 100 to the fourth layer substrate 400, and distortion of the radiation pattern can be prevented through the conductive wall.

Referring to FIGS. 1 and 3, a second metal pattern 210 is formed on the second layer substrate 200. The second metal pattern 210 may have a ground potential.

A dipole radiator 230 coupled to the second metal pattern 210 is formed on the second layer substrate 200. The dipole radiator 230 receives a feed signal from the feeding pattern 140 in a coupling manner. The dipole radiator 230 radiates the feed signal provided from the feeding pattern 140 to the outside.

The dipole radiator 230 includes a first dipole arm 230-1 and a second dipole arm 230-2. The first dipole arm 230-1 and the second dipole arm 230-2 are spaced apart from each other.

In FIG. 3, a case is shown in which a dipole radiator 230 is used as the antenna radiator of the present disclosure, but it will be apparent to those skilled in the art that other types of radiator may be formed.

Referring to FIGS. 1 and 4, reflectors 410 and 412 are formed on the third layer substrate 300. The reflectors 410 and 412 are preferably formed in a region overlapping the first slot 120 and the second slot 130 vertically. In FIG. 4, a case is shown in which the two reflectors 410 and 412 are spaced apart from each other, but it will be apparent to those skilled in the art that a single reflector may be substituted. The reflectors 410 and 412 reflect the signals radiated in the downward direction among the radiation signals of the dipole radiator 230 to increase the gain in the upward direction of the radiation signals of the dipole radiator 230.

Referring to FIGS. 1 and 5, the fourth layer substrate 400 is coupled to the lower portion of the third layer substrate 300. A ground plane (not shown) may be formed on a lower surface of the fourth layer substrate 400.

Figure 6:
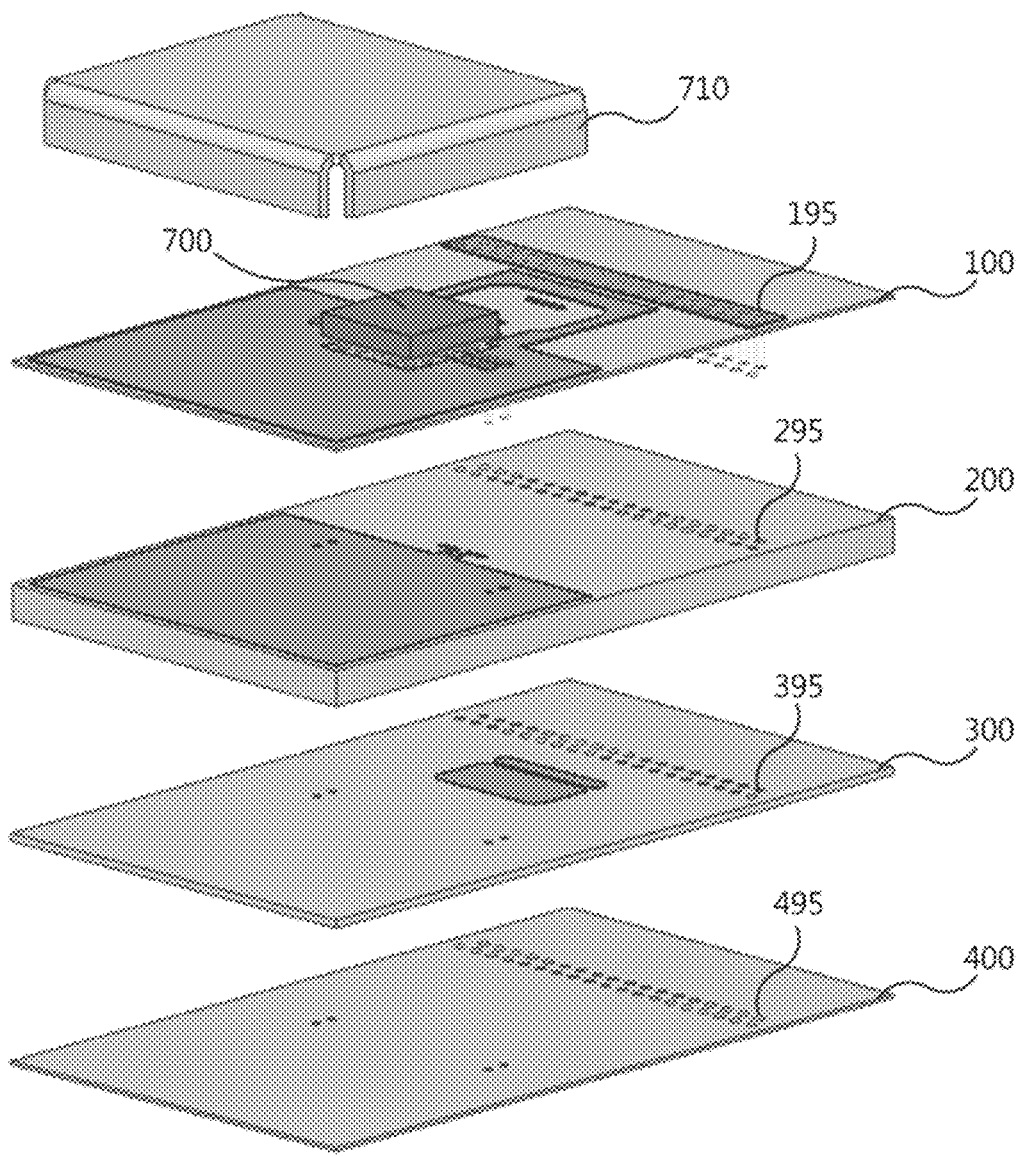
FIG. 6 is an exploded perspective view of a state in which an RFIC is coupled in an antenna according to an embodiment of the present disclosure.
Figure 7:
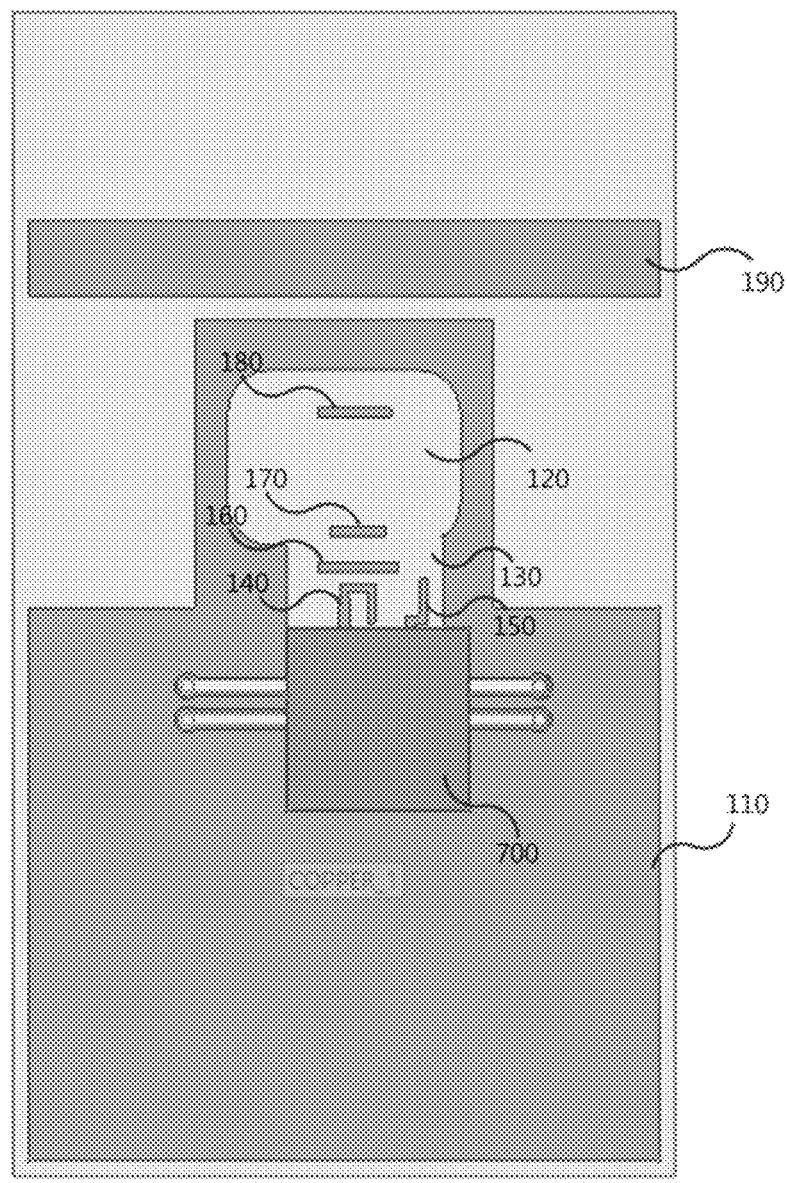
FIG. 7 is a plan view of a first layer substrate to which an RFIC is coupled.

FIG. 6 is an exploded perspective view of a state in which an RFIC is coupled in an antenna according to an embodiment of the present disclosure, and FIG. 7 is a plan view of a first layer substrate to which an RFIC is coupled.

Referring to FIG. 6, an RFIC chip 700 is coupled to the region of the second slot 130 of the antenna according to an embodiment of the present disclosure, and a shield can 710 for shielding the RFIC chip is coupled. The shield can 710 may not be coupled as needed.

The RFIC chip 700 provides a feed signal to the feeding pattern 140, and the feeding pattern 140 is electrically connected to the RFIC chip 700. In addition, the RFIC chip 700 is electrically connected to the auxiliary radiator 150 to receive a signal received from the auxiliary radiator 150.

In the past, the RFIC chip was coupled to a board of the terminal and connected with an antenna through a connector, and due to this, there was a problem that not only the size increases, but also the manufacturing cost increases. The present disclosure proposes an antenna structure in which an RFIC chip is assembled without using a separate connector, by laminating the first layer substrate 100 on the second layer substrate 200 on which the dipole radiator 230 is formed, forming the first metal pattern 110 in which the first slot 120 and the second slot 130 are formed, and then coupling the RFIC chip on the first metal pattern 110.

For example, the RFIC chip 700 receives a feed signal from the PCB of the terminal, and via holes are formed in each layer substrate of the present disclosure to receive the feed signal from the PCB. In FIGS. 6 and 7, an example is shown in which two via holes are formed on the left side and two via holes on the right side with respect to the RFIC chip.

When the RFIC chip 700 is directly coupled to the antenna, unwanted electromagnetic waves generated from the RFIC chip 700 may increase, and these unwanted electromagnetic waves may act as a major factor causing electromagnetic interference. According to the present disclosure, in order to block electromagnetic interference generated when the RFIC chip 700 is directly coupled to the antenna, a shield can 710 for shielding the RFIC chip 700 may be additionally coupled.

Since the shield can 710 is made of a conductive material, it may block unnecessary electromagnetic waves generated from the RFIC chip 700, but may distort the radiation pattern of the dipole radiator 230. In order to prevent the distortion of the radiation pattern, a conductive wall is formed through the via holes 195, 295, 395 and 495 of each layer substrate.

Figure 8:
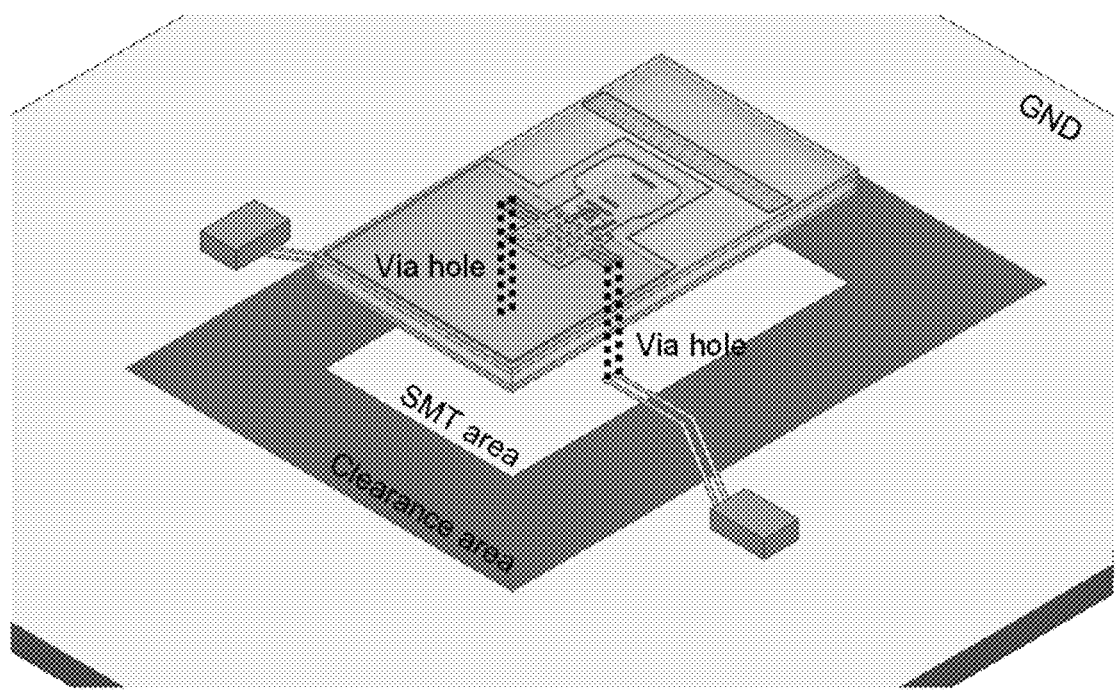
FIG. 8 shows an example in which an RFIC assembled antenna according to an embodiment of the present disclosure is coupled on a substrate.

FIG. 8 shows an example in which an RFIC assembled antenna according to an embodiment of the present disclosure is coupled on a substrate.

Referring to FIG. 8, an SMT area is set on the substrate, and the antenna made of the multi-layer substrate of the present disclosure is coupled to the SMT area. Since the antenna of the present disclosure has a structure in which the RFIC chip is assembled, it can be directly coupled to the substrate without being coupled to the substrate through a separate connector.

As described above, via holes are formed in the antenna of the present disclosure so that a feed signal from the substrate is provided to the RFIC chip.

Figure 9:
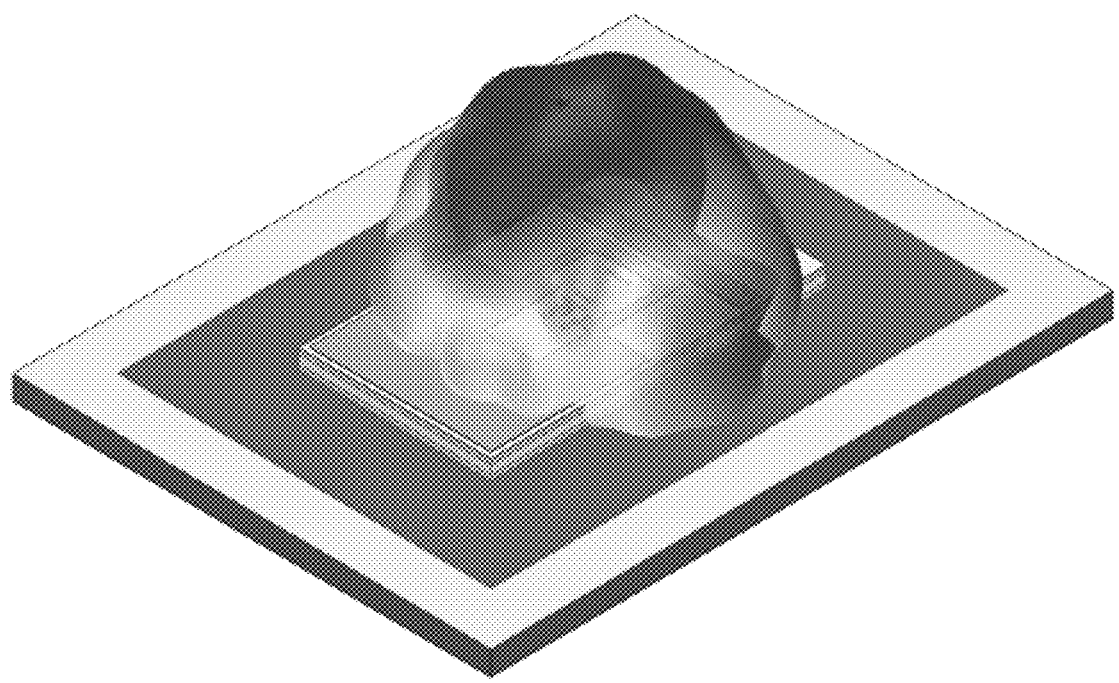
FIG. 9 shows an example of a radiation pattern of an RFIC assembled antenna according to an embodiment of the present disclosure.

FIG. 9 shows an example of a radiation pattern of an RFIC assembled antenna according to an embodiment of the present disclosure.

Referring to FIG. 9, in the RFIC assembled antenna according to an embodiment of the present disclosure, a radiation pattern is formed in an upward direction of the antenna. The gain of the beam in the upward direction can be improved due to the first slot 120, the second slot 130 and the plurality of via holes. In addition, the reflectors 410 and 412 formed on the third layer substrate 300 may also contribute to the improvement of the gain of the beam, and the conductive wall formed through the plurality of via holes 195, 295, 395 and 495 may prevent the radiation pattern from being tilted.

Meanwhile, since the auxiliary radiator 150 is located on the first layer substrate 100 that is an upper portion of the dipole radiator 230, it is possible to receive a portion of the signal radiated from the dipole radiator 230 to confirm whether an appropriate signal is radiated in an appropriate direction.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. An RFIC (Radio-Frequency Integrated Circuit) assembled antenna, comprising:
    a first layer substrate including a first metal pattern, a first slot formed in the first metal pattern, and a second slot formed to be connected to the first slot, and in which an RFIC chip is coupled to a region of the second slot; and
    a second layer substrate coupled to a lower portion of the first layer substrate and including a second metal pattern, a third slot formed in the second metal pattern, and a dipole radiator formed inside the third slot,
    wherein a feeding pattern connected to the RFIC chip to provide a feed signal to the dipole radiator is formed inside the first slot.

2. The RFIC assembled antenna according to claim 1, wherein at least one parasitic pattern spaced apart from the feeding pattern by a predetermined distance and extending in a direction perpendicular to a longitudinal direction of the feeding pattern is formed inside the first slot.

3. The RFIC assembled antenna according to claim 2, wherein an auxiliary radiator spaced apart from the feeding pattern by a predetermined distance and extending in a direction parallel to the longitudinal direction of the feeding pattern is further formed inside the first slot, and the auxiliary radiator is connected to the RFIC chip.

4. The RFIC assembled antenna according to claim 3, further including a third layer substrate positioned below the second layer substrate,
    wherein at least one reflector is formed on the third layer substrate in a region that vertically overlaps with the first slot and the second slot.

5. The RFIC assembled antenna according to claim 4, wherein the antenna is coupled to an SMT region of a terminal board, and at least one via hole for providing a feed signal from the terminal board to the RFIC chip is formed in the first to third layer substrates.

6. The RFIC assembled antenna according to claim 1, wherein the auxiliary radiator receives a portion of the signal radiated from the dipole radiator and provides it to the RFIC chip.

7. An RFIC (Radio-Frequency Integrated Circuit) assembled antenna, comprising:
    a first layer substrate including a first metal pattern, a first slot formed in the first metal pattern, and a second slot formed to be connected to the first slot, and in which an RFIC chip is coupled to a region of the second slot; and
    a second layer substrate coupled to a lower portion of the first layer substrate and including a second metal pattern and a dipole radiator coupled to the second metal pattern,
    wherein a feeding pattern connected to the RFIC chip to provide a feed signal to the dipole radiator is formed inside the first slot or the second slot, and
    wherein a shield can for shielding the RFIC chip is coupled to a region of the second slot of the first layer substrate.

8. The RFIC assembled antenna according to claim 7, wherein on the first layer substrate a third metal pattern is formed spaced apart from the first metal pattern, and a plurality of first via holes are formed in the third metal pattern.

9. The RFIC assembled antenna according to claim 8, wherein a plurality of second via holes connected to the first via holes are formed in the second layer substrate, and a plurality of third via holes connected to the plurality of second via holes are formed in the third layer substrate.

10. The RFIC assembled antenna according to claim 8, wherein at least one parasitic pattern spaced apart from the feeding pattern by a predetermined distance and extending in a direction perpendicular to a longitudinal direction of the feeding pattern is formed inside the first slot and the second slot.

11. The RFIC assembled antenna according to claim 8, wherein the antenna is coupled to an SMT region of a terminal board, and at least one via hole for providing a feed signal from the terminal board to the RFIC chip is formed in the first to third layer substrates.

12. The RFIC assembled antenna according to claim 7, further including a third layer substrate positioned below the second layer substrate,
    wherein at least one reflector is formed on the third layer substrate in a region that vertically overlaps with the first slot and the second slot.

13. The RFIC assembled antenna according to claim 12, wherein an auxiliary radiator is further formed spaced apart from the feeding pattern by a predetermined distance and extending in a direction parallel to a longitudinal direction of the feeding pattern, and wherein the auxiliary radiator is connected to the RFIC chip, receives a portion of the signal radiated from the dipole radiator, and provides it to the RFIC chip.

14. The RFIC assembled antenna according to claim 12, further including a fourth layer substrate coupled to a lower portion of the third layer substrate,
    wherein a plurality of fourth via holes connected to the plurality of third via holes are formed in the fourth layer substrate, and a ground plane is formed on a lower portion of the fourth layer substrate.

* * * * *